Sept. 16, 1958 F. E. WOOD 2,852,088
DAMPING PLATE
Filed March 16, 1956 2 Sheets-Sheet 1

INVENTOR.
Fredric E. Wood
BY
Atty.

Sept. 16, 1958    F. E. WOOD    2,852,088
DAMPING PLATE
Filed March 16, 1956    2 Sheets-Sheet 2

INVENTOR.
Fredric E. Wood
BY
Atty.

United States Patent Office 2,852,088
Patented Sept. 16, 1958

2,852,088

DAMPING PLATE

Fredric E. Wood, McHenry, Ill., assignor to General Telephone Laboratories, Incorporated, a corporation of Delaware Application March 16, 1956, Serial No. 572,034

4 Claims. (Cl. 181—31)

This invention relates to sound translating devices and more particularly to improvements in diaphragm damping means for magnetic diaphragm capsule type receivers.

In a typical telephone receiver of the magnetic diaphragm type such as disclosed in the application of Harold C. Pye, Serial No. 529,435, filed August 19, 1955, a diaphragm is used to form part of the magnetic circuit of the associated field structure and to vibrate in response to variations of the flux therein. The diaphragm is mounted to permit substantially free vibration. Thus mounted its response is greater at frequencies of vibration approaching its natural frequency, and falls off at frequencies above and below this. To flatten this response characteristic various methods have been utilized. A particularly successful method has been the combination of a resonating chamber with a friction damping member. This damping member may take the form of a friction damping plate located adjacent to the diaphragm. Such a plate functions to limit the rarefication and compression of the air in the chamber formed between this plate and the diaphragm. This limitation is due to the controlled ingress of air to the chamber during the rarefication of the air as the diaphragm moves away from the plate, and to the controlled egress of air from the chamber as the diaphragm moves toward the plate. The degree to which the diaphragm response is altered is dependent upon the distance this plate is located away from the diaphragm, that is, due to the size of the chamber and its natural resonant frequency, and to the rate of ingress and egress of air through the plate to this chamber. The greater the rate of air flow, that is, the lower the resistance to the passage of air, the more closely will the diaphragm response approach its free field characteristics. The smaller the rate of air flow, that is, the greater the resistance to the flow of air through it, the greater will be the effect of the chamber's resonance. Neither the diaphragm's resonance alone nor the combined characteristic with that due to the chamber's resonance provide an adequate receiver response. Therefore, the problem resolves itself into one of balancing the diaphragm's characteristics with a chamber of the proper size and a damping plate with the proper resistance to the passage of air. When the proper values for each of the factors involved are finally arrived at, after much research, another problem remains before commercial production can begin. The diaphragm's characteristics can be adequately controlled during manufacture as can also the size of the chamber adjacent the diaphragm, but not so readily the characteristics of the damping plate.

Yet the damping plate's characteristics must be more constant than those of the diaphragm or adjacent chamber if the commercially produced receivers are to have the desired performance. Previous forms of damping plates were produced in commercial quantities with fair success, but the amounts that were rejected because of undesirable characteristics were great. There has therefore been a great effort made to perfect the production methods on the existing damping plates as well as much research to develop a form whose characteristics could be more readily controlled.

It is an object of the present invention to make a damping member that will consistently contribute to an improved performance of the receiver.

It is a further object of the present invention to make this damping means of such a construction that its critical dimensions can be held to close tolerances while lending itself to economical production.

These and other objects and features of the invention will be readily understood from a reading of the following description in conjunction with the accompanying drawings in which.

Figure 1:
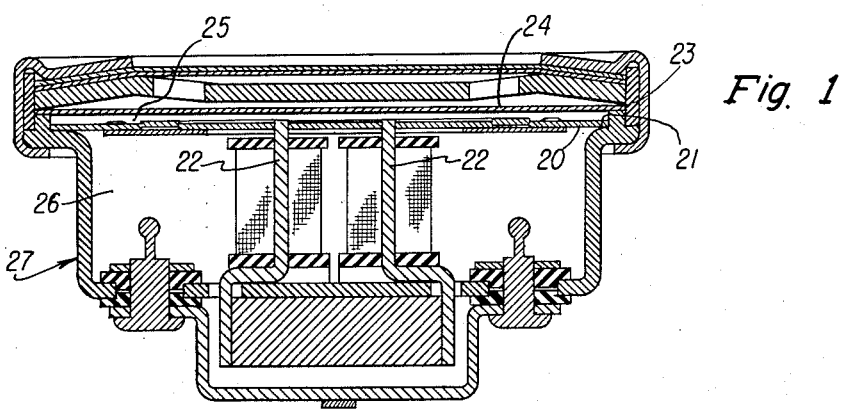
Fig. 1 is a sectional view of a magnetic capsule type receiver with a damping member according to an embodiment of this invention.
Figure 4:
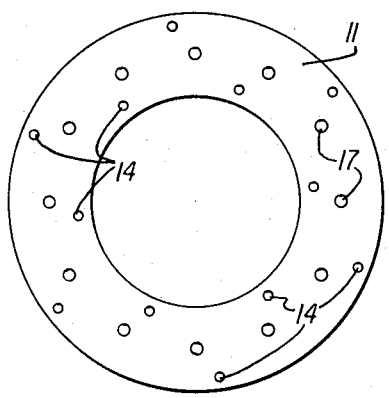
Fig. 4 is a plan view of the other component of the damping member.
Figure 2:
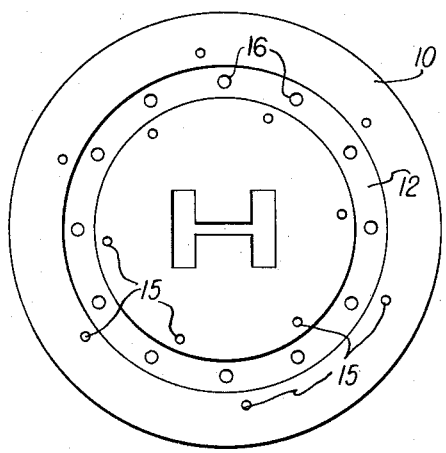
Fig. 2 is a plan view of one component of the damping member.
Figure 5:
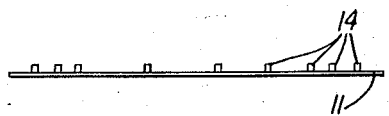
Fig. 5 is a side view of the component of Fig. 4.
Figure 3:
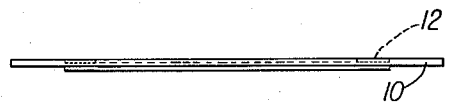
Fig. 3 is a side view of the component of Fig. 2.
Figure 6:
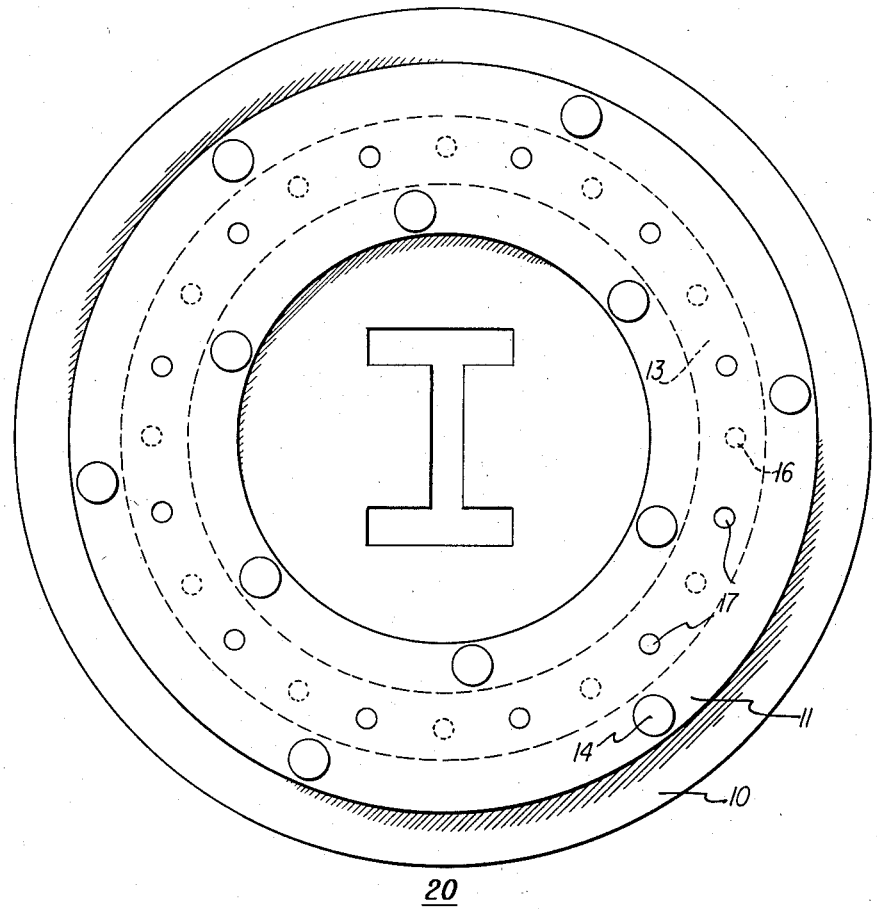
Fig. 6 is a plan view of the damping member assembled.
Figure 7:
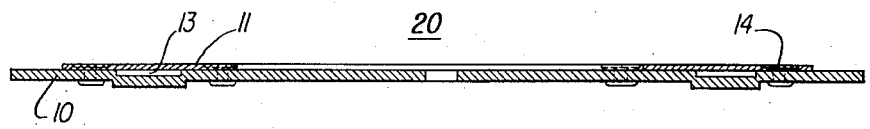
Fig. 7 is a sectional view of the damping member assembled.

The damping plate 20 of this invention is shown in Fig. 1 mounted in a telephone receiver. It rests on a shoulder 21 of the casing 27, with the magnetic pole-pieces 22 projecting through it. On another shoulder 23 stepped above the shoulder 21 is mounted the receiver diaphragm 24. Between the damping plate and the diaphragm 24 there is a chamber 25 whose axial dimension is very critical and must be closely controlled. The damping plate also creates another chamber 26 between itself and the casing 27. This damping plate is constructed of some non-magnetic material such, for example as aluminum, and is comprised of two discs 10 and 11 fastened together. The larger disc 10 Figs. 2 and 3 is provided with an annular channel 12 of rectangular cross section. This annular channel is located concentrically about the center of the plate as a shallow depression in the surface. A typical depth for this channel would be of the order of three thousandths of an inch. The smaller disc 11, Figs. 4 and 5, is annular and of such size that it will completely cover the channel in the larger disc to create a totally enclosed annular chamber 13 within the disc. These discs are fastened together by riveting. The annular disc 11 having a series of studs 14 projecting from it, which studs coincide with and pass through a corresponding series of holes 15 in the larger disc and are then headed over. The larger disc has another series of holes 16 equally spaced and located concentrically about the center to provide a plurality of passages to the annular chamber 13. On the opposite side of this annular chamber in the annular disc is another series of passages 17 located on a circle with a radius equal to that on which the holes in the larger disc are positioned. The holes in the annular plate do not however coincide with the holes in the larger disc, but fall in between them, thus any path for the passage of air through the disc must of necessity include a portion of this annular chamber. This baffled path and the incident turbulence created by it in the passing air provide a damping effect that is considerably more uniform for commercially produced units. The annular channel with its non-coincident passages in the two sides in addition to the baffle effect upon the passing air also serves as a resonant column of air for further modifying the damping characteristics and for equalizing pressure differences between the plurality of paths, thus averaging and spreading the effects of any randomly occurring off-size hole. It is obvious that the rate of flow of the air could be controlled by the proper size of holes in a single plate, however, this would not give proper damping. Proper control of damping can only be obtained by regulating the length and size of a column of air and by proper restriction to the flow of this column of air. By this very simple device including an annular chamber within a damping disc, one of exceptionally constant and reproducible performance was produced.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of forming an acoustic baffle plate for a sound transducer having restricted air passages between one side and the other thereof, which consists in forming an annular channel in a circular plate and a plurality of small holes in the bottom of said channel, in forming a series of small holes arranged in a circle around the center of a smaller plate, in then rigidly securing said plates together to form an enclosed annular channel with the holes in the smaller plate offset from the holes in the channel of the first plate whereby all passages from one side to the other thereof include a hole in each plate and a portion of the enclosed channel formed.

2. In a sound translating device having a vibratory diaphragm and a casing therefor in which the diaphragm is mounted, a damping disc mounted in said casing and dividing the space between the diaphragm and the casing into two chambers, said damping disc comprising a pair of plates secured rigidly together, one of said plates having an annular channel formed therein which channel is covered by said other plate, said channel providing an annular air space within said disc, a series of holes in one plate connecting one of said chambers with said annular air space and a series of holes in the other plate connecting the other of said chambers with said annular air space, said holes in said first plate offset from the holes in said other plate whereby any path from one chamber to the other chamber includes a portion of said channel, said channel serving as a means for equalizing the amount of air passing through said holes.

3. In a sound translating device having a vibratory diaphragm and a casing therefor in which the diaphragm is mounted, a damping disc mounted in said casing and providing a pair of damping chambers on one side of the diaphragm, said disc comprising a pair of plates rigidly secured together, one of said plates having an annular channel formed therein, said channel providing an annular air space completely enclosed within said disc, a series of holes in one plate communicating with one chamber, a series of holes in the other plate offset from said other holes and communicating with said other chamber, said holes and said channel forming restricted air passages between said chambers including said channel.

4. In a sound translating device having a vibratory diaphragm and a casing therefor in which the diaphragm is mounted, a damping disc mounted in said casing and dividing the space between the diaphragm and the casing into two chambers, said damping disc comprising a pair of plates rigidly secured together, one of said plates having an annular channel formed therein which channel is covered by said other plate, said channel providing an annular air column within said disc, a series of holes in one plate connecting one of of said chambers with said annular air column and a series of holes in the other plate connecting the other of said chambers with said annular air column, said holes in said first plate offset from said holes in said other plate whereby the passage of air from one chamber to the other is modified by the resonance of the air in said annular column.

References Cited in the file of this patent

UNITED STATES PATENTS

| | | |
|---|---|---|
| 2,645,301 | De Vries | July 14, 1953 |
| 2,672,525 | Pye | Mar. 16, 1954 |